W. N. Whiteley.
Harvester Rake.

Nº 67828. Patented Aug. 13, 1867.

Sheet 1 - 5 Sheets.

Witnesses.
A. L. H. Smith.
S. P. Campbell.

Inventor.
Wm N. Whiteley,
By his atty R. D. Smith,

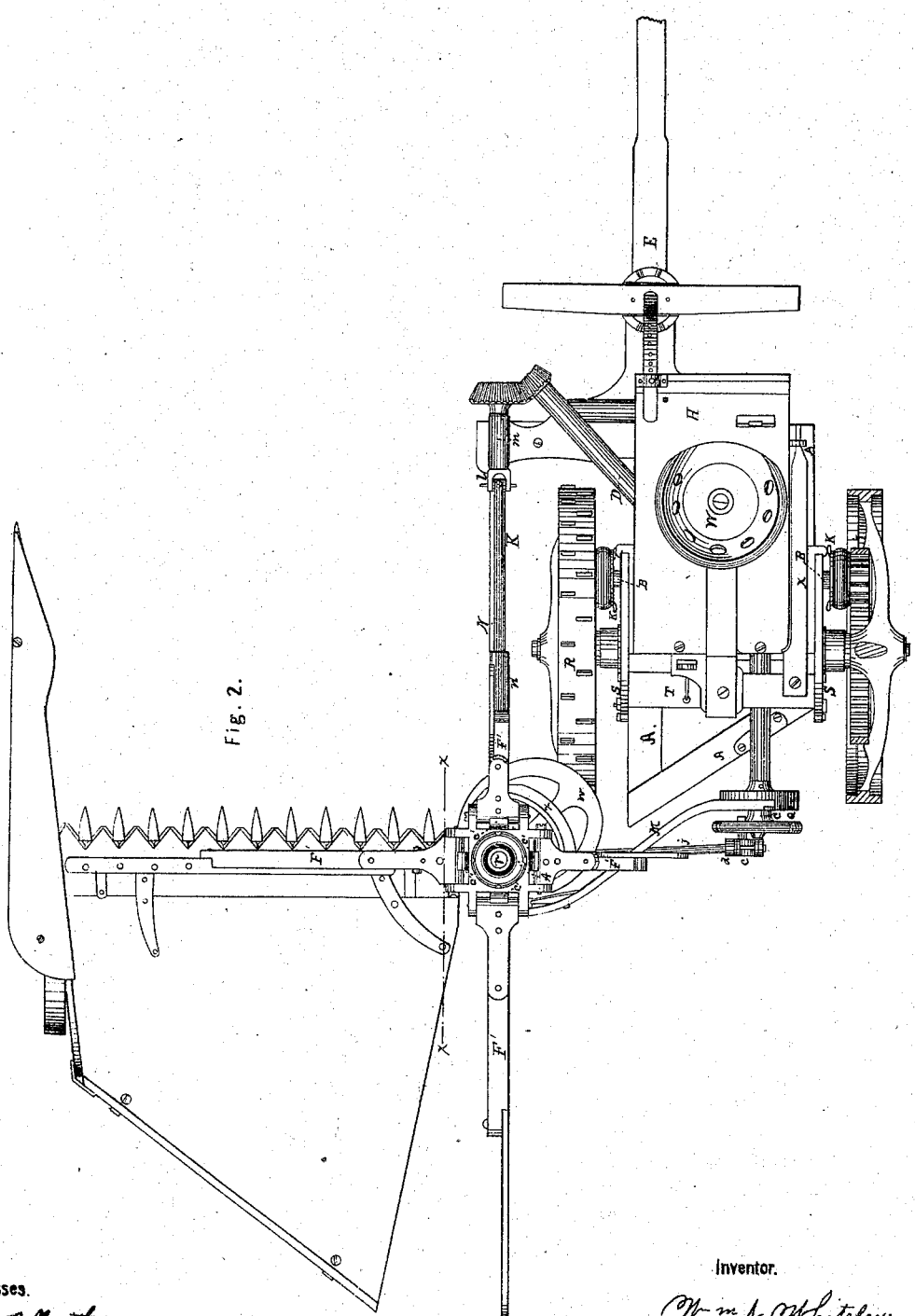

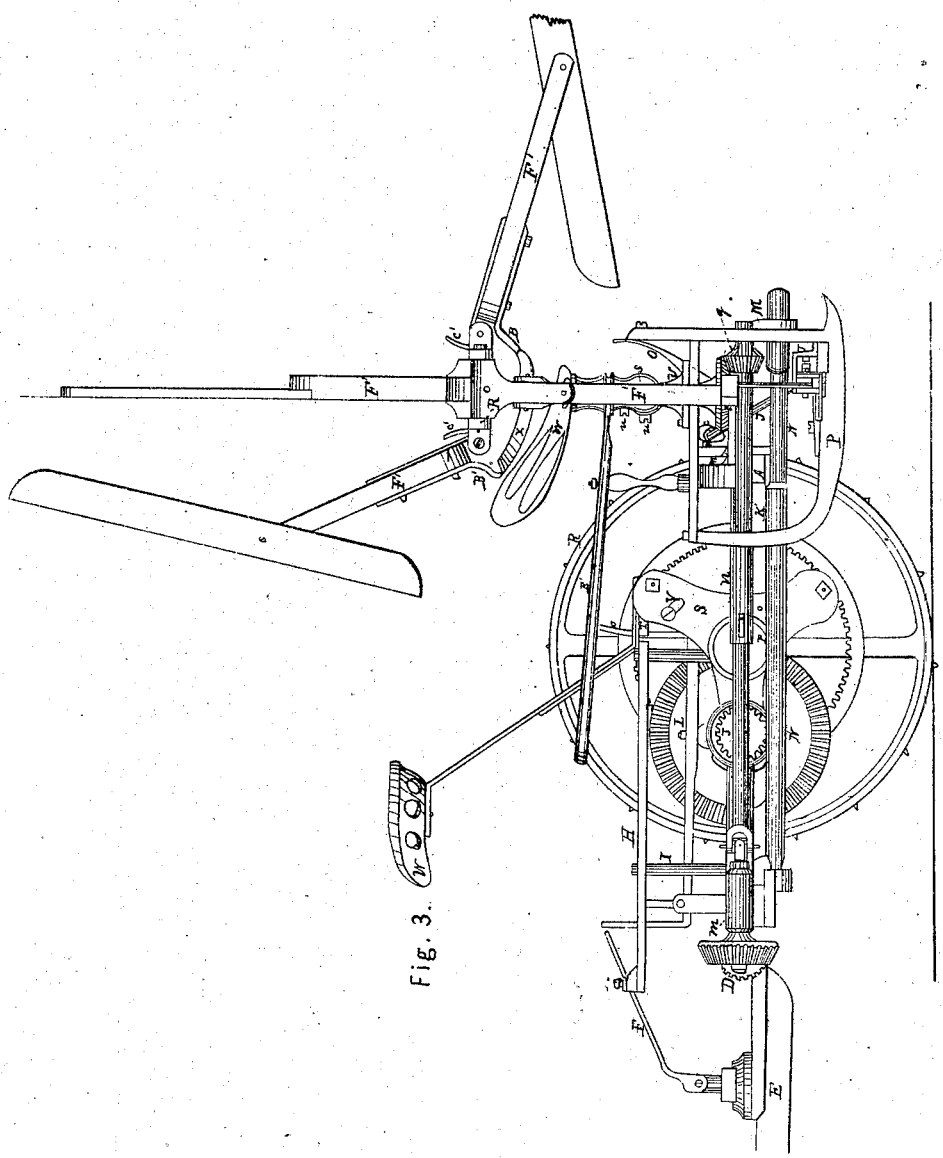

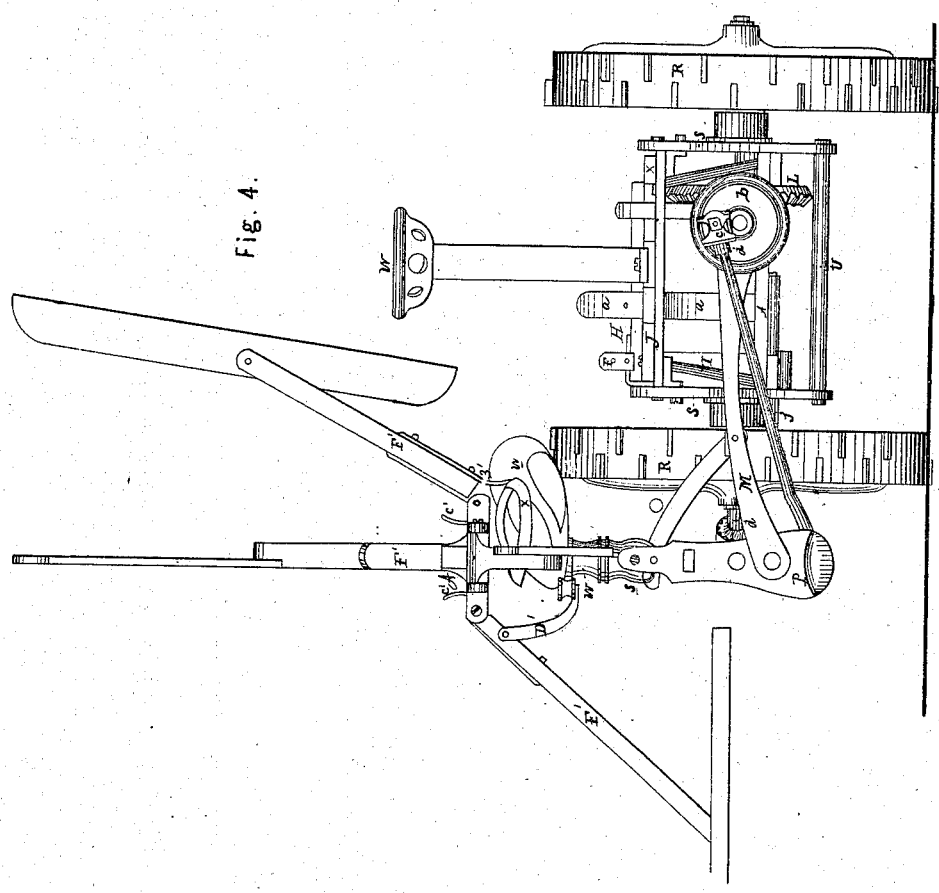

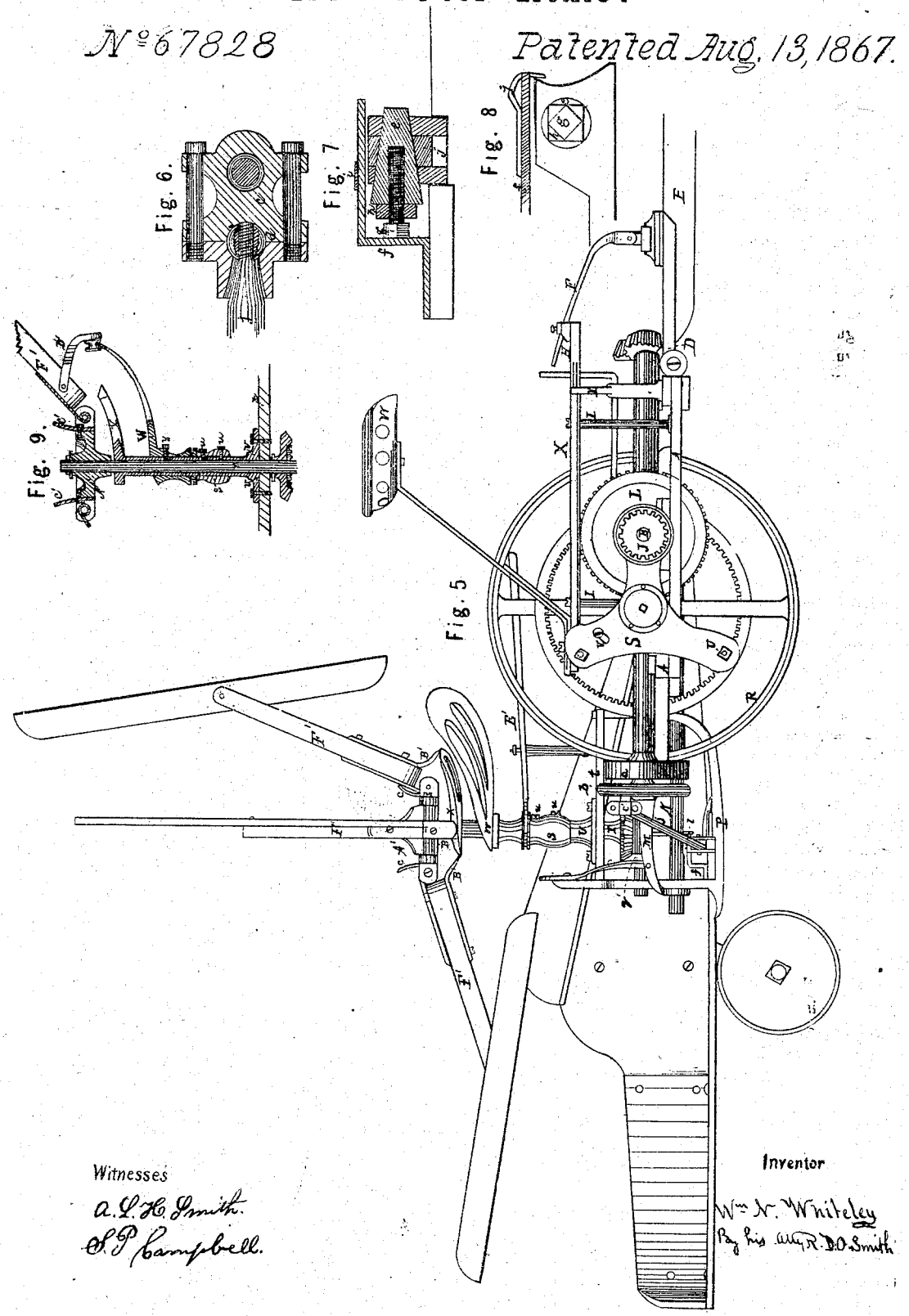

United States Patent Office.

WILLIAM N. WHITELY, OF SPRINGFIELD, OHIO.

Letters Patent No. 67,828, dated August 13, 1867.

---

IMPROVEMENT IN HARVESTERS.

---

*The Schedule referred to in these Letters Patent and making part of the same.*

---

TO ALL WHOM IT MAY CONCERN:

Be it known that I, WILLIAM N. WHITELY, of Springfield, in the county of Clark, and State of Ohio, have invented a new and useful Improvement in Harvesters; and I do hereby declare the following to be a full, clear, and exact description of the same, reference being had to the accompanying drawings, in which—

Figure 2 is a plan view of my machine.

Figure 3 is an elevation of the inner side of the main frame on line $x\,x$ of fig. 2.

Figure 4 is a rear elevation of the main frame and attachments, the platform not being shown.

Figure 5 is an elevation of the outer side of the machine.

Figure 6 is a vertical section of the pitman-head, showing its construction and attachment to the pitman.

Figure 7 is a vertical cross-section of the sickle-joint.

Figure 8 is an elevation of the side of the sickle-joint.

Figure 9 is a vertical section of the standard which supports the reel and the attachments thereto.

Figure 1:
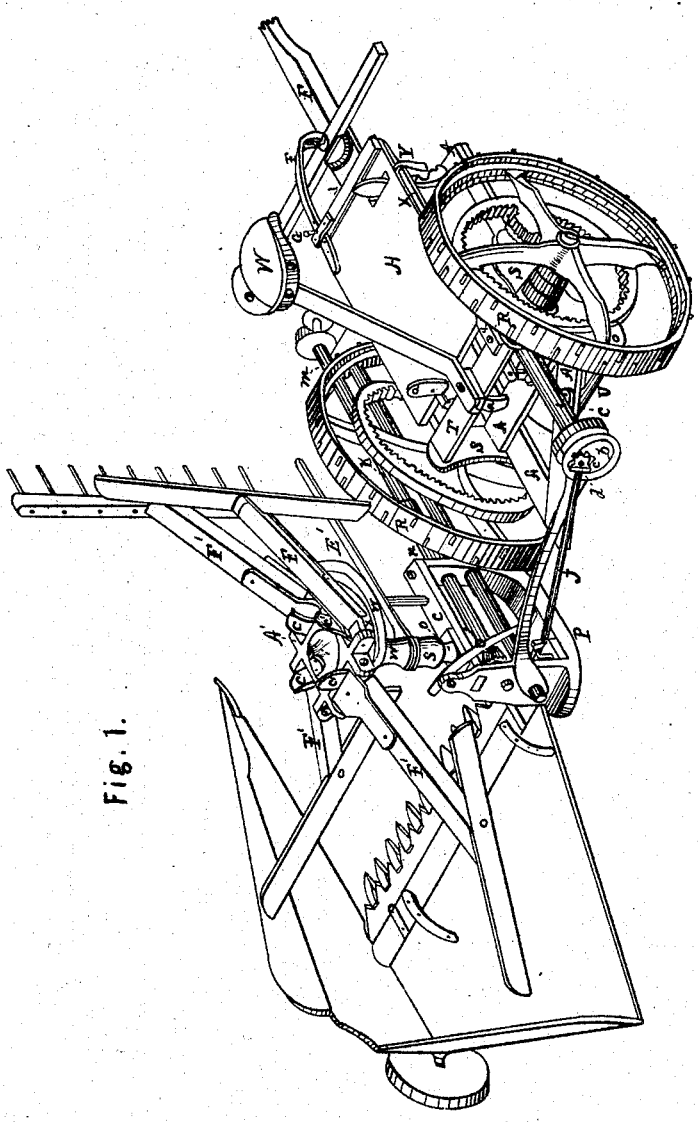
Figure 1 is a perspective view of my machine.

In the above figures the machine is represented as a reaper. It becomes a mower when the platform and reel and rake are removed, which requires no drawings to illustrate.

My invention relates to that class of harvesting machines which are known as combined reapers and mowers; and it consists, first, in the manner of connecting the cutting apparatus to the axis of the cutter's crank-shaft; second, in the manner of constructing the frame which carries the bearing-wheels, so that said wheels may be adjusted vertically in regard to the main frame, without the use of sector standards; third, in the manner of mounting the driver's seat, so as to be independent of the main frame of the machine; fourth, in the manner of constructing and connecting the cutter's driving-pitman; fifth, in the manner of constructing and combining the reel and rake-head with the required guides, so that the rake may be raised up independent of the reel to pass over the grain upon the platform, when desired.

That others may understand my invention, I will particularly describe it.

A is the main frame of my machine, upon which is mounted the main driving-pinion shaft B, the cutter's driving-crank shaft C, and the reel's driving-pinion shaft D. The tongue E is connected to the front end of the main frame by a flexible connection, but may be rendered rigid at any desired point of elevation by the strap F, through one of a series of holes, in which a pin, G, is thrust into a hole in the front edge of the driver's footboard H, which is mounted upon the main frame and is supported by the legs I. The bearing-wheel's pinions J J may be thrown out of gear independent of each other by clutches K, and the main bevel driving-gear L may be thrown in and out of gear, as desired, by means of a clutch upon the main driving-pinion shaft B. These features are not peculiar to this invention, and are not, in detail, essential to it. They are shown and alluded to merely for the purpose of rendering the operation and construction of those devices, to be hereafter described, completely understood.

When the machine is arranged for reaping it is required that the cutting apparatus should be supported at a certain distance above the surface of the ground, and this is accomplished by placing under one end a grain-wheel, and supporting the other end by its attachment to the main frame, while in mowing the cutting apparatus is permitted to slide upon the ground, rising and falling to conform to the undulations thereof, independent of the main frame, and the two ends independent of each other. In the first case it becomes necessary that the connecting-arm M (which has one of its ends centred upon the axis of the cutter's crank-shaft C, and the other end centred upon the axis of the drag-bar N,) should be rendered rigid, by securing one of its ends in a certain position, as regards the main frame or cutting apparatus. I prefer to secure it to the cutting apparatus, as securing the most nearly perfect result. I therefore use the brace O, which I secure by screws or bolts to the arm M, at or near its centre of length, and to the shoe P, at the inner end of the cutting apparatus. The brace O is provided with a series of holes near one of its ends, so that its effective length may be increased or diminished, as it is desired to support this end of the cutting apparatus at a greater or less distance from the ground. That end of the arm M which is centred upon the axis of the crank-shaft C has its bearing upon a hub, which forms a part of the box in which said crank-shaft revolves, and it is secured in place upon said bearings by a hooking-flange, Q, which projects over it from some convenient part of the adjacent frame. By reference to fig. 3 it will be seen that the effect of this arrangement will be, the cutting apparatus is secured to the main frame by a rigid arm, which is centred and moves upon the axis of the crank-shaft C, so that this end of the cutting apparatus must always be supported at the mean elevation of the main frame, while the two bearing-wheels of the machine may rise and fall with the undulations of the ground over which they are passing, causing the main frame to change its horizontality without changing materially the elevation of the cutting apparatus, because during such movements of the main frame, it may be supposed, and will, in fact, move in relation to the cutting apparatus upon the shaft C as a centre, and therefore will not necessarily disturb the position of the arm M.

When the machine is used for mowing the brace O is removed and the shoe P permitted to rest upon the ground. The connection of the cutting apparatus and the arm M is then flexible, so that the outer end of said apparatus may rise and fall, moving upon the axis of the drag-bar N as a centre, and the shoe P may rise and fall, moving the arm M upon its bearings at each end, and being maintained always at the same distance from the crank-shaft C, so that the position of the stroke of the cutter is unchanged in any event.

The bearing and driving-wheels R R are not attached to the main frame A directly, but are set upon two parallel plates S S, which are centred upon the axis of the main driving-pinion shaft B, so that as the axis of the wheel R changes its relative position to the main frame, the distance between said axis and the axis of the pinion-shaft B shall not be varied, and the pinions J will not be disconnected from their driving-gears on the wheels R. It is of course necessary, when using the coupling-arms or plates S, to so guard their movements that they shall not change their parallelism in any material degree, and this has hitherto been accomplished by providing a curved standard, upon which the edge of the coupling-plate should move and be secured from any other than the proper movement, by a grooved flange, or its equivalent, which should secure the plate to the standard. I have accomplished the desired result by attaching the two plates S S, not to standards, but to each other, by the cross-bars T U, which insure the continual parallelism of the two plates, and by the interposition of the main frame, which fills the space between them, they are prevented from moving laterally out of place. Thus the frame A may move up and down, in respect to the bearing-wheels and independent of the frame S, and without disturbing the connection of the driving-wheels with their pinions J.

The cross-bar T is not rigidly secured to the plates S. It is provided with cylindrical tangs at each end, which pass through holes in the plates S, and are secured by nuts on the outsides of said plates. These tangs also act as journals upon which the bar T may turn. This movement of T is limited, however, by a pin, which projects from the end of the bar through a curved slot, V, and is designed only to be sufficient to permit the upper surface of the cross-bar to remain always parallel with the upper surface of the main frame. This parallelism is rendered necessary by placing the driver's seat W upon this cross-bar, where it is at all times in the same position respecting the axle of the driving-wheels. In order to secure the proper position of the cross-bar T I bolt to the upper side of it the arm X, which thence passes forward beside the edge of the driver's foot-board, and through the eye Y, which is attached to the front bar of the main frame, and thereby retain the cross-bar T in about the same position to the surface of the main frame. The standard $a$ is erected upon the main frame and passes through a slot in the cross-bar T. It is provided with a series of holes, through one of which a pin may be thrust to connect it to the cross-bar T, or it may be secured by some other convenient means; the object being to hold the cross-bar T and main frame A in any determined position in respect to each other.

The driver's seat W being mounted upon the frame which connects the wheels, is independent of the movements of the main frame, and the movements of the latter are not affected by the weight of the driver. In reaping, the seat is thrown forward as in fig. 2, when the weight of the driver will counterbalance the weight of the platform and cutting apparatus; but in mowing, the position is reversed, the standard being turned about so as to bring the weight of the driver in rear of the axle $s$ of the main wheels R, and thus counterbalance the weight of the forward portion of the machine, and keeping the cutting apparatus down upon the ground.

The pitman $j$ is connected to the crank-wheel $b$ by the head $c$, through which the wrist-pin passes, and the ball-and-socket joint $d$, so that the side strain upon the wrist-pin and unequal wear may be obviated as much as possible. At the other end of the pitman the joint is formed by inserting the end between two lugs formed on the end of the cutter-bar, and passing a conical bolt, $e$, through a suitable hole formed in the lugs and pitman end. This bolt is kept in place by the guide $f$, which covers that end of the sickle-bar and retains it always in proper line of working. It is adjusted by the screw $g$, which projects from its larger end, and when in proper position always slides along against the inner surface of the guide $f$. The set-nut $h$ prevents any shifting of the adjusting-screw. This method of construction permits the pitman to be uncoupled from the cutter-bar without the removal of any nuts or screws, as it is only necessary to withdraw the cutter from the guide-way far enough to clear the head and bolt $e$ from the guide $f$. The spring-latch $i$ prevents any accidental withdrawal of the head of the cutter far enough to permit the bolt $e$ to become displaced; indeed, the cutter cannot be withdrawn far enough for that purpose except by uncoupling the pitman at the crank, or by raising the outer end of the cutting apparatus so that the cutter-bar is nearly vertical.

The rake and reel are driven by gearing throughout, and receive motion from the main driving-pinion shaft B, by means of the counter-shaft D and the jointed shaft $k$. As the cutting apparatus may be raised or lowered without disturbing the position of the main frame, it is of course necessary that the drag-bar N and the shaft $k$ should be so far flexible as to permit this change of position without affecting their operation. The drag-bar N is therefore connected to the front bar of the main frame by a ball-and-socket joint, and the shaft $k$ is jointed with a universal joint, $l$, the front portion being secured in position and proper line by the box $m$, which is bolted to the front cross-bar of the main frame. There is also liability of a slight end motion in backing or starting the machine when the cutting apparatus is alternately thrown forward or backward against its supports. This end motion, if uncompensated, would interfere with the working and connections of the gearing which drives the rake and reel. I therefore cut the shaft $k$, and rigidly secure one of the cut ends within the sleeve $n$, while the other cut end is permitted a limited movement back and forth within said sleeve. This movement is limited by a pin, $o'$, which passes through the shaft, and lies within the slot $p$ in the sleeve. The rear portion of the shaft $k$ passes through both of the lugs or upturned ends of the shoe P, and has its bearings therein. At a proper point within the space between these bearings I place the bevel-gear $q$, which transmits the motion of the shaft $k$ to the reel and rake-shaft $r$.

The shaft $r$, which carries the reel and the rake, is mounted in and supported by the hollow standard $v$, which is securely bolted to the bar $t$, one end of which is fitted by a tenon into a mortise in the upper end of one of the lugs of the shoe P, while the other end is fitted to the top of the other lug of the said shoe, and secured there by a screw-bolt or equivalent means. The shaft $r$ and its bevel-gear, which meshes with the gear $q$, projects below the bar $t$, but is not connected to any other part of the frame of the machine, so that when the screw is removed which secures the said bar to the top of the lug of the shoe P, the entire reel, rake, and their attachments may be removed from the machine, thus materially facilitating the operation of transforming the reaper into a mowing machine.

The hollow shaft $v$ is secured upon the top or upper side of the bar $t$ by screws or equivalent contrivances. Upon the outer side of the shaft $v$ is the stop $s$, which is secured in position by the screws $u$ $u$, and may be adjusted up or down, as may be necessary to regulate the movement of the rake. The rake-guide $w$ slides up and down freely upon the shaft $v$, but is prevented from moving laterally thereon by the pin $y$, which projects into a slot in the shaft $v$ for that purpose. The reel-guide $x$ is secured rigidly to the upper end of the shaft $v$.

The driving-shaft $r$ passes upward through the standard or shaft $v$ into the rake and reel-head A', to which the rake and reel-arms F' are hinged, so that they are compelled to revolve when the shaft $r$ revolves, but are at liberty to rise and fall vertically, moving upon the hinge joints by which they are connected to the head A', in obedience to the conformation of the guides $w$ and $x$, which are so shaped that while the rake or reel-arms are passing over the platform, they will move in a direction about parallel with said platform, and will then suddenly rise up to a position nearly vertical, to pass above the main frame at as great a distance as possible, descending again rapidly to strike into the grain standing in front of the cutters. The fingers B' are secured to the lower side of each reel-arm, and curving downward, rest upon the top and outer edge of the guide $x$, while the springs C' prevent so much movement of the reel or rake-arms as will throw them past a perpendicular, and prevent their return toward the platform at the proper time. The rake is supported above its guide by the pendent arm D', which is pivoted to the rake-arm, and has at its lower end a friction-roller to travel on the edge of the guide $w$.

It is sometimes necessary to elevate the rake as it passes over the platform, so that it shall not remove the grain. This occurs when the grain is very thin, and a sufficient quantity for a gavel is not secured at one revolution of the rake. In this machine I elevate the rake when desired by means of the lever E', which raises the guide $w$ and the rake sufficiently far above the platform to avoid removing any grain which may be upon it.

Having described my invention, what I claim as new, and desire to secure by Letters Patent, is—

1. The construction and arrangement of the coupling-arm M, the brace O, or its equivalent, in connection with the inner shoe of a harvester cutting apparatus, and the cutter's crank-shaft, so that the cutting apparatus may rise and fall upon a centre, at the inner or the outer end of said coupling-arm, or be made rigid, as desired, and substantially as described.

2. The coupling-plates S S, connected together by the cross-bars T U, in combination with the main frame A, and standard $a$, substantially as and for the purpose set forth.

3. The driver's seat W, located upon the cross-bar T, so that the weight of the driver will rest directly upon the bearing-wheels, and not upon the main frame, substantially as and for the purpose set forth.

4. Forming the joint of the pitman and cutter-bar by the use of a loose conical plug, which is kept in place by guide-way $f$, or its equivalent for that purpose, and may be removed without the aid of tools when the head of the cutter-bar is withdrawn from said guide, substantially as and for the purpose set forth.

5. The plug $e$, set-screw $g$, and jam-nut $h$, in combination with the guide-way $f$, pitman $j$, and the sickle-eye, substantially as and for the purpose set forth.

6. The rake-arm F', in combination with the independent guide $w$, so that said rake may be raised and held up during its entire revolution, by the raising of said guide, and without changing the path of the reel-arms, substantially as and for the purpose set forth.

7. The pendent arm D', with its friction-roller, in combination with the rake-arm F, and the independent guide $w$, substantially as and for the purpose set forth.

WM. N. WHITELY.

Witnesses:
REUBEN MILLER,
GEO. W. BENNS.